(12) United States Patent  
Byron et al.

(10) Patent No.: US 9,317,814 B2  
(45) Date of Patent: Apr. 19, 2016

(54) AUTOMATICALLY GENERATING AN ONTOLOGY AND AXIOMS FROM A BUSINESS-PROCESS MODEL

(71) Applicant: International Business Machines Corporation, Armonk, NY (US)

(72) Inventors: Donna K. Byron, Petersham, MA (US); Reinaldo T. Katahira, Anhagabau (BR); Lakshminarayanan Krishnamurthy, Round Rock, TX (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 13/848,083

(22) Filed: Mar. 21, 2013

(65) Prior Publication Data

US 2014/0289173 A1 Sep. 25, 2014

(51) Int. Cl.  
*G06F 15/18* (2006.01)  
*G06N 99/00* (2010.01)  
*G06Q 10/00* (2012.01)  
*G06F 17/30* (2006.01)

(52) U.S. Cl.  
CPC ........ *G06N 99/005* (2013.01); *G06F 17/30734* (2013.01); *G06Q 10/00* (2013.01)

(58) Field of Classification Search  
None  
See application file for complete search history.

(56) References Cited

U.S. PATENT DOCUMENTS

| 6,507,856 B1 * | 1/2003 | Chen et al. ................. 715/205 |
| 7,512,576 B1 | 3/2009 | Syeda-Mahmood et al. |
| 8,112,257 B2 * | 2/2012 | Weber et al. ................. 703/6 |
| 8,301,573 B2 | 10/2012 | Chen et al. |
| 8,326,795 B2 | 12/2012 | Markovic |
| 8,332,864 B2 | 12/2012 | Bose et al. |
| 2008/0097748 A1 | 4/2008 | Haley et al. |
| 2009/0077531 A1 | 3/2009 | Miloslavsky et al. |
| 2010/0031232 A1 | 2/2010 | Glazier et al. |
| 2010/0031240 A1 | 2/2010 | Drumm et al. |
| 2010/0070517 A1 | 3/2010 | Ghosh et al. |
| 2010/0082691 A1 | 4/2010 | Jaster et al. |

(Continued)

OTHER PUBLICATIONS

Maedche, Alexander, et al, "The Ontology Extraction & Maintenance Framework Text-To-Onto" Proceedings of the ICDM'01 Workshop on Integrating Data Mining and Knowledge Management, 2001.*

(Continued)

*Primary Examiner* — Ben Rifkin  
*Assistant Examiner* — Isidore Sobkowski  
(74) *Attorney, Agent, or Firm* — Schmeiser, Olsen & Watts, LLP; John Pivnichny (57) ABSTRACT

A method and associated systems for automatically generating an ontology and a set of axioms from a business-process model that represents the operations of a business. This ontology and set of axioms may be used to create the knowledgebase of an artificially intelligent expert system that emulates the business operations. A processor parses a representation of business processes stored in the business-process model, deriving a set of axioms and a set of entity classes from the parsed data. The processor uses these axioms and classes to identify concept nodes and process nodes, which it organizes into the ontology of the knowledgebase. The processor further identifies information derived from the parsed data to create a set of triple data items, each of which represents the information represented by one or more of the derived axioms. These triples are stored in the knowledgebase as a triple store data structure.

11 Claims, 3 Drawing Sheets

(56) References Cited

U.S. PATENT DOCUMENTS

| | | | |
|---|---|---|---|
| 2011/0029947 A1 | 2/2011 | Markovic | |
| 2012/0284386 A1 | 11/2012 | Liu et al. | |
| 2013/0006698 A1* | 1/2013 | Roy et al. | 705/7.27 |
| 2015/0006437 A1 | 1/2015 | Byron et al. | |

OTHER PUBLICATIONS

Cimiano Philipp "Learning Concept Hierarchies from Text Corpora using Formal Concept Analysis," Journal of Artificial Intelligence Research 24 (2005) p. 305-339.*

Battle, Steve, et al "Semantic Web Services Ontology (SWSO)," W3C Member Submission Sep. 9, 2005.*

Sahota et al., Ttl: Decomposing a process model in an enterprise intelligence 6974, Database: Dimple (Dossier); 2011.

Hepp et al., An Ontology Framework for Semantic Business Process Management, Proceedings of Wirtschaftsinformatik 2007, Feb. 28-Mar. 2, 2007, Karlsruhe (forthcoming), 18 pages.

Filipowska et al., Organisational Ontology Framework for Semantic Business Process management, 13 pages.

Jenz & Partner, Research, Analysis and Consulting with a clear Focus on Business Process Integration, Ontology-Based Business Process Editor in Development, Retrieved from the Internet: <URL: http://www.bpiresearch.com/Resources/RE_BPEdit/re_bpedit.htm>, 1 page.

Hepp et al., Semantic Business Process Management: A Vision Towards Using Semantic Web Services for Business Process Management, 4 pages, Oct. 12-18, 2005.

Brambilla et al., Process Modeling in Web Applications, 2001 ACM 1073-0516/01/0300-0034, 39 pages.

Sirin et al., Semi-automatic Composition of Web Services using Semantic Descriptions, 9 pages, 1st Workshop on Web Services, 2003.

Anya et al., A Conceptual Design of an Adaptive and Collaborative e-Work Environment, Proceedings of the First Asia International Conference on Modelling & Simulation (AMS '07), 0-7695-2845-7/07, 2007 IEEE, 7 pages.

Office Action (Aug. 13, 2015) for U.S. Appl. No. 13/928,495, filed Jun. 27, 2013, Conf. No. 1017.

Amendment (Nov. 5, 2015) for U.S. Appl. No. 13/928,495, filed Jun. 27, 2013, Conf. No. 1017.

Notice of Allowance (Nov. 25, 2015) for U.S. Appl. No. 13/928,495, filed Jun. 27, 2013, Conf. No. 1017.

* cited by examiner

AUTOMATICALLY GENERATING AN ONTOLOGY AND AXIOMS FROM A BUSINESS-PROCESS MODEL

TECHNICAL FIELD

The present invention relates to using the contents of a business-process model to automatically generate components of an artificially intelligent computer program.

BACKGROUND

An artificially intelligent computer program may store data and logic in a knowledgebase that represents characteristics of a real-world system. The knowledgebase of an artificially intelligent expert system may comprise an ontology and a set of axioms, and an expert system that simulates the operations of a business may comprise ontologies and axioms derived from representations of those operations stored in a business-process model. Deriving an ontology and a set of axioms from such representations may be a painstaking, time-consuming task.

BRIEF SUMMARY

A first embodiment of the present invention provides a method for automatically generating an ontology and a set of axioms from a business-process model, wherein the business-process model comprises a representation of a set of business processes, wherein the ontology comprises a set of concept nodes and a set of process nodes, and wherein an axiom of the set of axioms comprises a subject, an object, and a predicate, the method comprising:

a processor of a computer system parsing the representation into a set of parsed data;

the processor deriving the set of axioms as a function of the set of parsed data;

the processor identifying the set of concept nodes as a function of the set of parsed data and identifying the set of process nodes as a further function of the set of parsed data;

the processor populating the ontology with the set of process nodes and the set of concept nodes.

A second embodiment of the present invention provides a computer program product, comprising a computer-readable hardware storage device having a computer-readable program code stored therein, said program code configured to be executed by a processor of a computer system to implement a method for automatically generating an ontology and a set of axioms from a business-process model, wherein the business-process model comprises a representation of a set of business processes, wherein the ontology comprises a set of concept nodes and a set of process nodes, and wherein an axiom of the set of axioms comprises a subject, an object, and a predicate, the method comprising:

the processor parsing the representation into a set of parsed data;

the processor deriving the set of axioms as a function of the set of parsed data;

the processor identifying the set of concept nodes as a function of the set of parsed data and identifying the set of process nodes as a further function of the set of parsed data;

the processor populating the ontology with the set of process nodes and the set of concept nodes.

A third embodiment of the present invention provides a computer system comprising a processor, a memory coupled to said processor, and a computer-readable hardware storage device coupled to said processor, said storage device containing program code configured to be run by said processor via the memory to implement a method for automatically generating an ontology and a set of axioms from a business-process model, wherein the business-process model comprises a representation of a set of business processes, wherein the ontology comprises a set of concept nodes and a set of process nodes, and wherein an axiom of the set of axioms comprises a subject, an object, and a predicate, the method comprising:

the processor parsing the representation into a set of parsed data;

the processor deriving the set of axioms as a function of the set of parsed data;

the processor identifying the set of concept nodes as a function of the set of parsed data and identifying the set of process nodes as a further function of the set of parsed data;

the processor populating the ontology with the set of process nodes and the set of concept nodes.

A fourth embodiment of the present invention provides a process for supporting computer infrastructure, said process comprising providing at least one support service for at least one of creating, integrating, hosting, maintaining, and deploying computer-readable program code in a computer system, wherein the program code in combination with said computer system is configured to implement a method for automatically generating an ontology and a set of axioms from a business-process model, wherein the business-process model comprises a representation of a set of business processes, wherein the ontology comprises a set of concept nodes and a set of process nodes, and wherein an axiom of the set of axioms comprises a subject, an object, and a predicate, the method comprising:

a processor of a computer system parsing the representation into a set of parsed data;

the processor deriving the set of axioms as a function of the set of parsed data;

the processor identifying the set of concept nodes as a function of the set of parsed data and identifying the set of process nodes as a further function of the set of parsed data;

the processor populating the ontology with the set of process nodes and the set of concept nodes.

DETAILED DESCRIPTION

The present system automates the design and implementation of expert systems and other artificially intelligent systems by automatically generating an ontology and a set of axioms from information stored in a business-process model.

An expert system is an artificially intelligent computer program that mimics the cognitive behavior of human beings. The artificial intelligence that underlies such a program may be stored in a data structure known as a knowledge base, and a knowledge base may be implemented as a set of "ontology" data models and a set of "triple store" data repositories, wherein the ontologies and triple stores represent the intelligence comprised by a set of axioms.

In this context, one or more axioms may comprise a rule or logical statement of a function or process. Such an axiom may comprise an input entity, a process, and an output entity, wherein the process generates the output entity as a function of the input entity.

In this context, an ontology is a representation of knowledge within a particular context, where that context is known as the "domain" of the ontology. An ontology stores knowledge, as conceptualized within a context of a domain, as a set of concepts and as relationships between pairs of those concepts.

In an example, an ontology defined within the domain of a company's computer network might represent concepts:
user
computer
memory
installed memory
memory usage.

The ontology might further represent relationships:
user may use computer
memory may be installed
computer may contain installed memory
user may monitor usage of installed memory.

An axiom is a logical premise that may be used to draw a conclusion or to make a decision. Here, the logic comprised by an axiom may be represented as a "triple" data structure that comprises a predicate, a subject, and an object, wherein the predicate identifies an action or function; the subject performs the action or function or is an input to the action or function; and the object is a result of the action or function or is an entity upon which the action or function is performed.

In an example, a triple "monitors (user, memory usage)" might represent an axiom "User monitors memory usage." In this example, the triple's predicate is "monitors," its subject is "user," and its object is "memory usage."

An axiom represented by a triple may be expressed in other forms or with other types of syntax. The above triple, for example, may be equivalent to a functional expression "memoryusage hasmonitor user."

An expert system may make decisions based on a set of axioms stored as a set of triples. Such a stored set may be known as a "triple store," and such a triple store may be organized into data structures that may comprise, but are not limited to, linked lists, trees, tables, databases, directed graphs, networks, or semantic chains.

In an example, a data structure that links or otherwise relates two triples:
monitor (user, memory usage)→imply (memory usage, memory)

might express a more complex, conditional axiom: "If a user is monitoring memory usage, then the existence of memory usage implies that memory is installed" or, more simply, "Memory must be installed if a user is monitoring memory usage."

An expert system might use such a pair of related triples, possibly augmented by other axioms, by other known facts, or by other extrinsic information sources, to infer an answer to a user's question "Is memory installed in my computer?"

The structures and formats illustrated here are not intended to imply constraints upon the types of ontologies and expert systems that may be within the scope of the present invention. The method of the present invention may be used with expert systems and business-process models that comprise other types of representations of axioms, triples, and triple stores.

Creating an ontology and generating a corresponding set of axioms by populating a triple store may be complex and resource-intensive tasks. Special care must be taken to ensure that the concepts, processes, and relationships that may be comprised by an ontology are accurately represented within the context of the ontology (wherein such a context may be referred to as the ontology's "domain.")

A concept "wing," for example, may have different meanings and may be represented differently in an ontology that represents knowledge within the context of the aircraft industry than the concept "wing" would in an ontology that represents knowledge within the context of the science of ornithology. In another example, depending on an ontology's domain, a concept "CD" could be interpreted as referring either to a certificate of deposit or to a compact disc.

The method of the present invention may automatically generate an ontology through an automated translation of all or part of the contents on a business-process model. Such automated translation of a business-process model ensures that the ontology comprises concepts and relationships appropriate to the domain or context of the business-process model.

The method of the present invention further uses all or part of the contents of the business-process model to initialize a triple-store data structure and to automatically populate that data structure with "triple" representations of axioms that the method automatically derives from the business-process model. Here, such axioms may represent concepts comprised by the business-process model within the context of the business-process model's domain.

A business-process model represents the business processes of an enterprise. A business-process model may comprise a formal or informal representation of core business characteristics, operations, and functions, such as the business's structure or methods of creating revenue. A business-process model might comprise, but is not limited to, representations of the business's policies, procedures, service offerings or product lines, organizational structures, security framework, or workflows.

A business process may be a set of related activities that a business directs toward producing a service or product for a particular customer or customers. Business processes may comprise, but are not limited to: operational processes that implement the primary operations of the enterprise, such as manufacturing, logistics, or sales; management processes, such as executive-management policies or line-supervision procedures; and support processes, which may comprise peripheral functions within the scope of departments like Human Resources or Customer Support.

A business-process model may comprise representations of some or all of an enterprise's business processes as combinations of structured and unstructured information. Such a model may comprise data from which an ontology and a set of axioms may be derived, wherein the domain of the resulting ontology is appropriate to the context of the information comprised by the business-process model. Extracting, analyzing, and structuring this information can be a challenging task if done manually, but the present invention simplifies this process by automatically generating a domain-appropriate ontology and a set of axioms from a business-process model.

Figure 1:
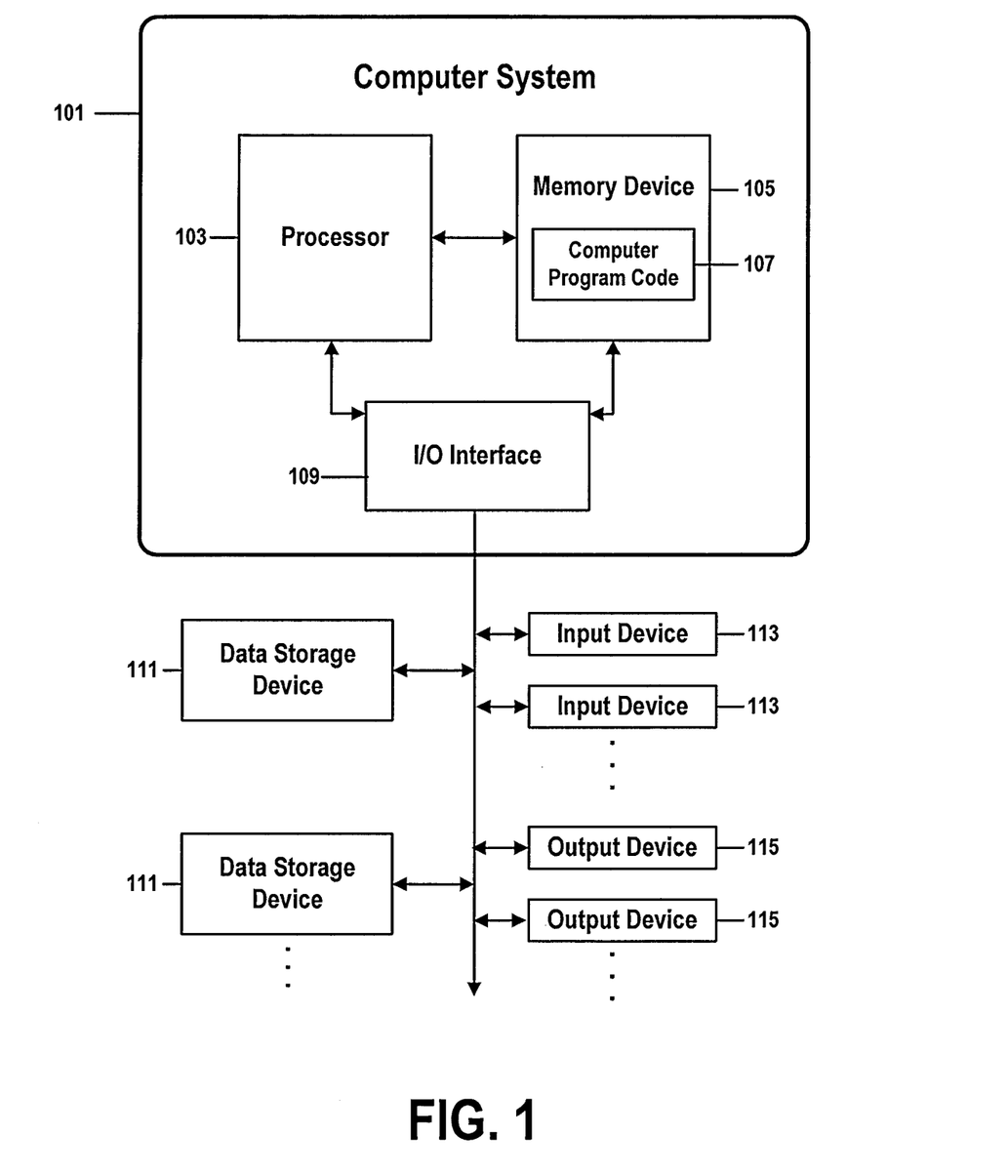
FIG. 1 shows the structure of a computer system and computer program code that may be used to implement a method for automatically generating an ontology and a set of axioms from a business-process model in accordance with embodiments of the present invention.

FIG. 1 shows the structure of a computer system and computer program code that may be used to implement a method for automatically generating an ontology and a set of axioms from a business-process model in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-4 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The flowchart illustrations and/or block diagrams FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for automatically generating an ontology and a set of axioms from a business-process model in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for automatically generating an ontology and a set of axioms from a business-process model.

Any of the components of the present invention could be created, integrated, hosted, maintained, deployed, managed, serviced, supported, etc. by a service provider who offers to facilitate a method for automatically generating an ontology and a set of axioms from a business-process model. Thus the present invention discloses a process for deploying or integrating computing infrastructure, comprising integrating computer-readable code into the computer system 101, wherein the code in combination with the computer system 101 is capable of performing a method for automatically generating an ontology and a set of axioms from a business-process model.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

Figure 2:
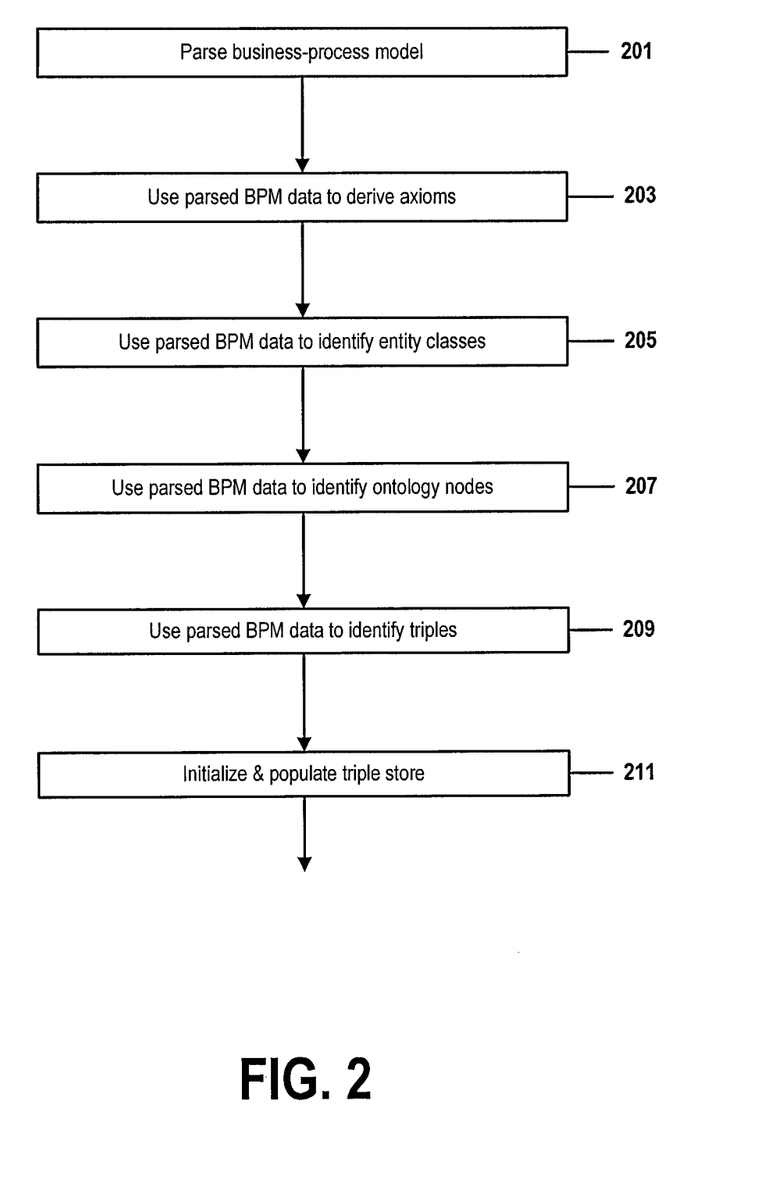
FIG. 2 is a flow chart that summarizes an embodiment of a method for automatically generating an ontology and a set of axioms from a business-process model in accordance with embodiments of the present invention.
Figure 3:
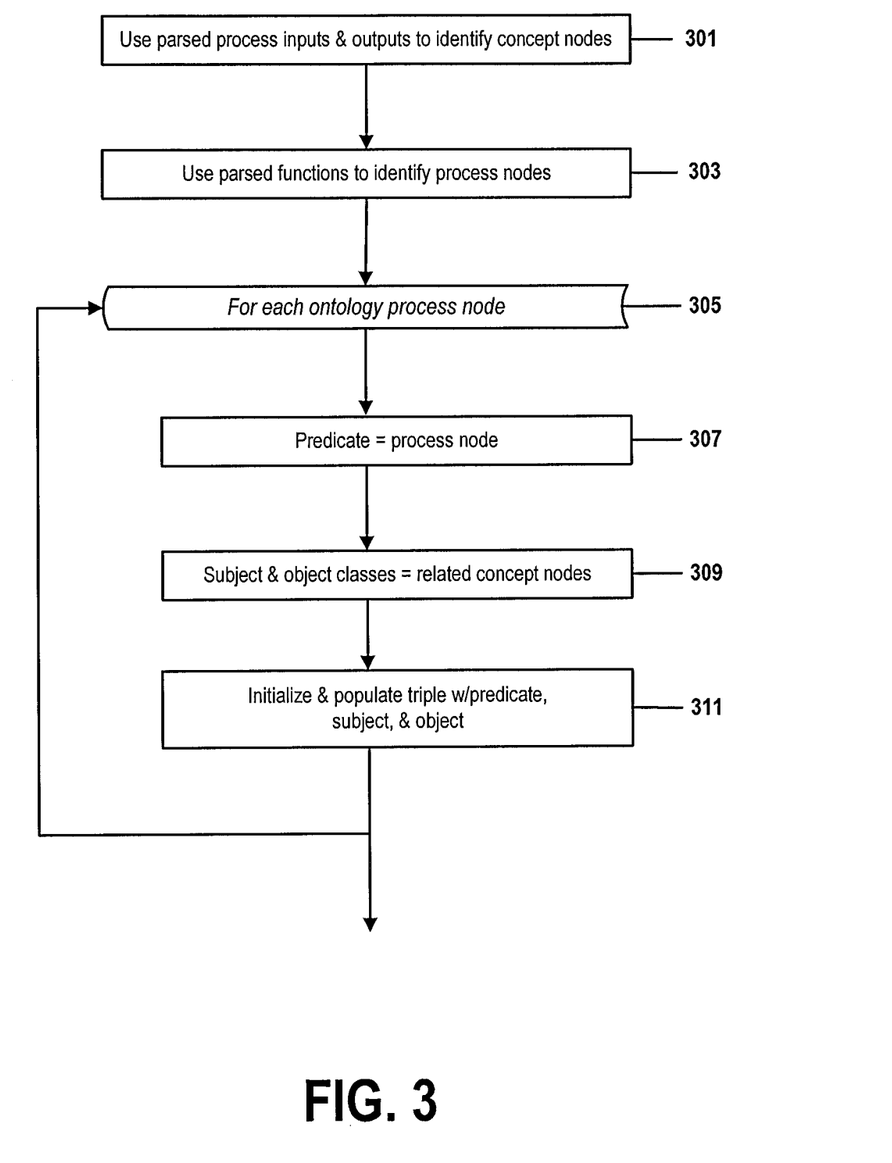
FIG. 3 is a flow chart that further describes the ontology-creation process and the triple store-creation process of FIG. 2 steps 207-211 in accordance with embodiments of the present invention.

FIG. 2 is a flow chart that summarizes an embodiment of a method for automatically generating an ontology and a set of axioms from a business-process model in accordance with embodiments of the present invention. FIG. 2 comprises steps 201-211. FIG. 3 describes steps 207-211 in greater detail.

A business-process model may formally or informally describe activities that a business directs toward producing a service or product for one or more customers. Business-process models may take many forms and may be organized in many ways, sometimes comprising both structured and unstructured stores of data.

The method of FIG. 2 automatically and dynamically generates an ontology and a set of axioms from a business-process model, wherein the business-process model represents business activities as sets of processes, wherein the business-process model associates a process of the set of processes with one or more input entities and with one or more output entities; and wherein the business-process model represents the process as performing a function on the one or more input entities to produce the one or more output entities, or represents the process as being performed by the one or more input entities upon the one or more output entities.

An ontology may comprise information organized into one or more networks, trees, directed or nondirected graphs, or other types of data structures. Each such data structure may store information as sets of nodes, wherein a node identifies one or more elements of the information represented by the ontology.

In some embodiments, an ontology may comprise process nodes and concept nodes, wherein a process node may identify a function of a business process and a concept node may identify a class of concepts that may be associated with an input entity of a business process, an output entity of a business process, or a function of a business process. Because the nodes comprised by an ontology may be organized into hierarchical structures, a node may be identified by a set of nodes that comprise a path through a hierarchical structure.

A concept node "continent/country/city," for example, might identify a class or category of stored data items that each identify or represent the name of a city. In this example, the "city," "country," and "continent" concept nodes might be organized into a branch of a treelike data structure comprised by an ontology. In such a case, the "city" node may be accessed by traversing a branch that comprises related nodes "continent" and "country."

Such a structure may imply hierarchical or other types of logical relationships among data items that are respectively associated with the three classes of entities represented by the three nodes in the branch. A set of data items of class "city," for example, may be associated with a subset of a set of data items that have a particular value of class "country," and those two sets of data items may be further associated with a subset of a set of data items that have a particular value of class "continent." Thus a stored data item "Los Angeles" of class "city" might be associated in this exemplary ontology with a set of data items associated with a value "United States" of class "country" and with a set of data items associated with a "North America" of class "continent."

Another type of node that may be stored in an ontology is a "process" node, which identifies a function performed by a business process. In an example, a process node "market-projection/AggregateCitySales" might identify a process wherein a step of a marketprojection procedure comprises a function of aggregating sales figures recorded in one city. As with concept nodes, a process node may be, but is not necessarily, logically represented in an ontology as a node of a set of nodes organized into a hierarchical, branching, or nested data structure.

In an ontology, a process node may be associated with a set of concept nodes. A first node of the associated set of concept nodes may be a subject node, wherein the relationship between the subject node and the process node is analogous to the relationship between an input entity and a function of a business process in a business-process model. A second node of the associated set of concept nodes may be an object node, wherein the relationship between the object node and the process node is analogous to the relationship between an output entity and a function of a business process in a business-process model. A triple comprising a process node and a pair of related concept nodes may thus be analogous to a function, subject, and object of a business process. As will be explained below, embodiments of the present invention may generate and further store this type of information as a triple data item that comprises a predicate (function), subject, and object. In such embodiments, the method of the present invention may organize and store a set of such triple data items in a data structure or repository known as a "triple store."

In some cases, an ontology may further comprise a triple store or an associated set of axioms, wherein an axiom of the associated set of axioms is comprised by the ontology, rather than being distinct from the ontology.

The method of the present invention thus relates information stored in a business-process model to information that would be stored in an ontology and further relates such modeled information to representations of a set of axioms.

Step 201 dynamically parses metadata comprised by a business-process model in order to identify information that may be used to automatically generate an ontology's data structure, concept, and process nodes, a set of related axioms, and a related triple store. As will be explained below, the parsed information may represent one or more business processes represented in the business-process model, and may further comprise representations of the inputs and outputs (or, analogously, subjects and objects) associated with each such process.

In some embodiments, the parsing comprises identifying a first input entity, a first output entity, and a first function associated with a first business process comprised by the business-process model. In some cases, the parsing comprises identifying a proper subset of the first input entity, the first output entity, and the first function associated with the first business process.

In some embodiments, the parsing may further comprise identifying a set of classes, wherein the first input entity may be associated with a first class of the set of classes, the first output entity may be associated with a second class of the set of classes, and the first function may be associated with a third class of the set of classes.

The parsing may comprise any parsing method or technology known to those skilled in the art of computer science. The choice and implementation of such a parsing method may be implementation-dependent and may be a function of considerations like the contents and internal organizations of the business-process model and ontology, the formats in which axioms are represented or stored, the goals of the system designer, and the relationships among the business-process model and the expert system or knowledgebase that comprises the ontology and axioms.

Step 203 uses the parsed metadata generated in step 201 to automatically and dynamically generate a set of axioms that represent characteristics of the business processes identified in the business-process model. The format and representation details of these axioms are implementation-dependent and can be determined through techniques and procedures known to those skilled in the art of computer science, management science, or information technology.

In some embodiments, an axiom of the set of axioms may be represented in more than one format, including both structured and unstructured formats. In embodiments, the general structure of a first axiom of the set of axioms may be that of a logical statement, expressed in any format, including mathematical, functional, and freeform-text formats, known to those skilled in the art.

In other embodiments, a general structure of a first axiom may be that of a first function, wherein the first function is performed upon a first input entity in order to produce a first output entity, or wherein the first function is performed by a first input entity upon a first output entity. In such embodiments, the first input entity may be associated with a first entity class, the first output entity may be associated with a second entity class, and the first function may be associated with a third entity class, wherein the method of step 203 may identify the first, second, and third entity classes and their respective associations with the first input entity, the first output entity, and the first function. In some embodiments, these identifications and associations may be defined in a step analogous to step 203 that is performed concurrently with step 201. In some embodiments, these identifications and associations may be defined through other means, such as by reference to extrinsic information, standards, or procedures, through other logical or deductive procedures, or through reference to a software template.

In some embodiments, an axiom of the set of axioms may be represented by one or more "triple" data structures, wherein a set of these triple data structures is organized and stored into a larger data structure known as a "triple store." The format of a triple may be implementation-dependent, and in embodiments described herein, a triple may conform to the generalized functional syntax:

predicate (subject, object).

In other embodiments, an axiom may be represented in other formats or by other syntactical forms, including various types of computer instructions, scripts, or freeform text, using techniques and procedures known to those skilled in the art of computer science, management science, or artificial intelligence.

Step 205 automatically and dynamically identifies entity classes that are represented in the parsed business-process model metadata generated in step 201. An identified class may be associated with or deemed analogous to an ontology concept node. An identified class may be associated with an input entity, output entity, or function associated with an axiom, associated with a business process, or associated with some element of the business-process model data parsed in step 201. An identified class may be associated with a subject, object, or predicate associated with a triple.

The details of the methods of these identifications or associations are implementation-dependent, and may employ data-search, data-analysis, or data-manipulation tools and techniques known to those skilled in the art of computer science, management science, artificial intelligence, or information technology.

Step 207 uses the information generated in steps 201-205 to automatically and dynamically generate an ontology. This generation may comprise identifying sets of concept nodes, sets of process nodes, and data structures that comprise the sets of concept nodes and the sets of process nodes. These data structures, in conjunction with the triple store generated in steps 209-211, may identify or represent data and logic that may be used to design and implement a knowledgebase of an expert system. The domain of this generated ontology and the significance and meaning of the axioms represented by the contents of the triple store may be a function of the context of the information represented by the contents of the business-process model.

In some embodiments, these data structures may comprise trees, networks, directed or nondirected graphs, or other types of data structures that identify relationships among the generated nodes, wherein the data structures may be identified as functions of the parsed business-process model metadata that was generated in step 201 or may be identified as functions of the axioms and related data and logic identified in step 203.

In some embodiments, this automatically generated ontology may further comprise the triple store generated in step 211. In other embodiments, the generated ontology and the generated triple store may be distinct entities.

The method of step 207 is described in greater detail in steps 301-303 of FIG. 3.

Step 209 automatically and dynamically identifies a set of triple data items, wherein each triple of the set of triples comprises a subject, an object, and a predicate. A first triple of the set of triples may comprise a first subject, a first object, and a first predicate, wherein the first subject, the first object, and the first predicate may be inferred from a representation of a first business process comprised by the parsed business-process model data generated in step 201. In some embodiments, the first subject, the first object, and the first predicate may be may be respectively associated with a first input entity, a first output entity, and a first function, wherein the first input entity, the first output entity, and the first function are comprised by a first axiom generated in step 203.

In other words, a first triple identified in step 209 may be associated with a first axiom generated in step 203, and with a first business process comprised by the business-process model or comprised by the parsed data generated by step 201.

Step 211 uses the information derived in steps 201-209 to automatically and dynamically define, initialize, and populate a triple store data structure with the triples generated in step 209. In this context, the term "triple store" may refer generally to any data structure or structured or unstructured repository that comprises a plurality of triples. A triple store may be organized in manners that comprise, but are not limited to, one or more linked lists, trees, networks, directed or nondirected graphs, databases, other data structures, or free-form lists, text, or tables.

In some embodiments, a triple store may further comprise logical relationships or other associations among two or more triples comprised by the triple store. One or more triples in such a triple store, possibly in conjunction with one or more of the logical relationships or other associations, may represent an axiom of the set of axioms derived in step 203.

In some embodiments, the ontology generated in step 207 may further comprise the triple store. In other embodiments, the generated ontology and the generated triple store may be distinct entities.

FIG. 3 is a flow chart that further describes the ontology-creation process and the triple store-creation process of FIG. 2 steps 207-211 in accordance with embodiments of the present invention. FIG. 3 comprises steps 301-311.

Step 301 automatically and dynamically identifies a set of concept nodes of an ontology as a function of the entity classes generated in step 205. In embodiments, a concept node may be associated with an entity class identified in step 205. In other embodiments, one or more concept nodes identified in step 301 and one or more entity classes identified in step 205 may be related by a one-to-many relationship or by a many-to-one relationship.

A predicate, subject, or object of a triple identified in steps 307-311 may be associated with no more than one class of the set of entity classes identified by step 205 of FIG. 2 and may further be associated with no more than one concept node of the set of concept nodes identified in step 301.

If a process identified by a process node in step 301 requires arguments, those arguments may each be associated with a type or class identified in step 205 or by a corresponding type or class identified by a concept node in step 301. A "LoanApproval" process, for example, might be represented as a triple, wherein the triple is associated with a subject that is of a type "qualifiedLoanUnderwriter," and wherein the triple is further associated with an object that is of a type "LoanApplication." In this example, an ontology might comprise a process node that identifies the process "LoanApproval," further comprise a related first concept node that identifies entity class "qualifiedLoanUnderwriter," and further comprise a related second concept node that identifies entity class "LoanApplication." Such a set of related nodes could represent a business process or an axiom wherein a "qualified loan underwriter" performs a "loan approval" function upon a "loan application."

In some embodiments, an axiom of the set of axioms derived in step 203 of FIG. 2 may comprise a function, an input entity, and an output entity, wherein the function is performed upon the input entity in order to produce the output entity, or wherein the input entity performs the function upon the output entity. In such embodiments, the function may be associated with a first class of the set of entity classes identified by step 205 or by a first concept node identified by step 301, the input entity may be associated with a second class of the set of entity classes identified by step 205 or by a second concept node identified by step 301, and the output entity may be associated with a first class of the set of entity classes identified by step 205 or by a third concept node identified by step 301.

In some embodiments, the set of concept nodes and the set of process nodes may be sufficient to describe an ontology. In other embodiments, an ontology may comprise other features or elements, such as the triple store generated in step 211 or step 311. In some embodiments, concept nodes and process nodes comprised by the ontology may be organized in the ontology into one or more data structures.

In embodiments wherein an ontology comprises such a data structure, methods of the present invention may organize the process nodes and concept nodes identified in steps 301-303 by analyzing or interpreting the parsed metadata information generated in step 201. This parsed information may comprise representations of relationships among business processes and entities comprised by the business-process model. Embodiments of the present invention may further use these relationships to organize process nodes and concept nodes into data structures within the ontology that represent these relationships. In some embodiments, these representations of relationships may be functions of the context of the business-process model or may be functions of the domain of the ontology.

Step 303 automatically and dynamically identifies a set of process nodes of an ontology generated by the method of the present invention by analyzing the business processes represented in the business-process model data parsed in step 201. This identification may comprise identifying a first function associated with a first axiom generated in step 203, or with a first business process comprised by the business-process model, or with an element of the parsed data generated in step 201.

In some embodiments, step 303 will identify a first process node for a first axiom derived in step 203 for a first triple identified in step 209, wherein the first process node is associated with a function of the first axiom or with a predicate of the first triple.

Step 305 initiates an iterative process that may be performed once for each process node identified by step 301, and which comprises steps 305-311. A first iteration of this iterative process may be performed for a first process node of the set of process nodes identified in step 301. The first iteration may initialize and populate a first triple as a function of the first process node, wherein the first triple may comprise a first predicate, a first subject, and a first object, wherein the first predicate may be associated with or may be analogous to the first process node, and wherein the first triple may be associated with or may be analogous to a first business process of the business-process model. The first triple may be further associated with or analogous to a first axiom of the set of axioms identified by step 203, wherein the first process node may further be associated with or analogous to a first function of the first axiom, and wherein the first axiom may be associated with or may be analogous to the first business process.

Each iteration of the iterative process of steps 305-311 initializes and populates a triple with information generated by the method of the present invention in steps 201-207 of FIG. 2, as elaborated by steps 301-303 of FIG. 3. Upon completion of the final iteration of the process of steps 305-311, the embodiment of FIG. 3 will have generated a set of triples and organized them into or stored them in a triple store data structure or repository.

Step 307 identifies the first predicate of the first triple as being a function of or equivalent to the first process node.

Step 309 identifies the first subject of the first triple and the first object of the first triple. In some embodiments this step identifies the first subject as being equivalent to or a function of a first input entity associated with the first axiom and identifies the first object as being equivalent to or a function of a first output entity associated with the first axiom. In some embodiments this step identifies the first subject as being associated with a first subject class or type associated with the first input entity and identifies the first object as being associated with a first object class or type associated with the first output entity. The first subject class or type and the second subject class or type may each have been identified in step 205 of FIG. 2 and may each be associated with a respective concept node of the set of concept nodes identified in step 301.

In some embodiments, an input entity of a business process or an output entity of a business process may be a function of another business process. In such cases, one or both of the business process's input entity and output entity may be represented as a function of a second process or as a function of a third process, one or both of a corresponding axiom's input entity and output entity may be represented as a function of a second axiom or as a function of a third axiom, and one or both of a corresponding first triple's subject and object may be represented as a predicate of a second triple or as a predicate of a third triple.

In such embodiments, a dependency between two business processes or axioms, such as when the two processes or axioms represent steps of an algorithm, can further result in a predicate of a second triple comprising the object of a first triple (and equivalently, a function of a corresponding second business process or corresponding second axiom comprising an output entity of a corresponding first business process or an output entity of a corresponding first axiom). Other methods may be used to represent, in the business-process model, in the triple store, or in the ontology, dependencies between pairs of business processes or between pairs of axioms. These other methods may comprise techniques, data structures, and procedures known to those skilled in the art of computer science, artificial intelligence, or management science.

In an example of such embodiments, an ontology that comprises two process nodes "CheckCreditScore" and "ApproveLoan" might represent those nodes as sequential steps of a larger process, axiom, algorithm, or procedure. The ontology might then identify a predicate of ApproveLoan to be an object (or output) of process "CheckCreditScore." In other words, "CheckCreditScore" would perform a function on input data in order to generate a positive or negative loan-approval function. This positive or negative function would then perform a function associated with the "ApproveLoan" process.

In further variations of this class of embodiments, a first process, represented as a process node, might be capable of producing many output functions, each of which might be the predicate of one or more other processes. A first function of these output functions might also determine or identify a next process node of an overarching process, axiom, algorithm, or procedure.

In yet other variations of such embodiments, the predicate of a first triple may comprise a subject, object, or predicate of a second triple. Similarly, a subject, object, or predicate of the second triple may be inferred from the predicate or object of the first triple.

Step 311 initializes the first triple and populates it with the first predicate, the first subject, and the first object. In some embodiments, the first triple may take the form:

first predicate (first subject, first object).

In other embodiments, the first triple may conform to other structured or unstructured formats known to those skilled in the art.

At the conclusion of the last iteration of the iterative process of steps 305-311, the iterative process will have generated a set of triples that may be organized into or stored in a triple store, wherein the triple store comprises the set of triples, wherein each triple of the set of triples may be associated with one axiom of the set of axioms generated in step 203, and wherein each triple of the set of triples may be associated with one business process of the set of business processes comprised by the business-process model.

In some embodiments, this triple store may be comprised by the ontology generated by step 209. In other embodiments, the generated ontology and the generated triple store may be distinct entities.

The following example summarizes an embodiment of the method of the present invention, in accordance with the embodiments of FIGS. 1-3.

Consider a business-process model that comprises data and metadata that represents a company's business processes. Embodiments of the method of the present invention might parse those representations into a standard, embodiment-specific, parsed format embodiment. The exact format of the model's representations and of the parsed format are not novel features of the present invention and may comprise any formats known to those skilled in the art of management science, computer science, or artificial intelligence.

In this example, the parsed data might comprise representations of a set of business processes or rules:

(1) A regional manager prepares a regional sales report.
(2) A regional manager is subordinate to a national sales manager.
(3) A national sales manager is subordinate to a Director of Sales.
(4) Regional sales reports are compiled into a national sales report.
(5) National sales reports are compiled into an annual report.

These English-language rules each correspond to logic represented by the contents of the business-process model and, in this embodiment, each further corresponds to one or more axioms of a set of axioms. Each such axiom comprises a function, an input entity, and an output entity, wherein the input entity may perform the function upon the output entity, or wherein applying the function to the input entity produces the output entity.

The present invention may represent axioms in any way known to those skilled in the art. The embodiment of this example represents an axiom as a straightforward statement of a logical rule or of a step of a process, but in other embodiments, these representations may comprise more formal structures, including, but not limited to, hierarchical or linked data structures.

Embodiments of the present invention may use techniques known to those skilled in the art to identify a set of entity classes comprised by or represented by the parsed data. Such techniques may comprise or be related to language-parsing or token-identification functions commonly used by designers of programming-language compilers, natural-language parsers, and user interfaces. Here, these techniques may identify a class as a noun-adjective phrase in an appropriately parsed set of data, but in other embodiments, other techniques and procedures may be used. In some cases, a class may be identified all or in part by considering extrinsic information sources.

Similarly, embodiments of the present invention may use techniques known to those skilled in the art to identify a set of axiom functions comprised by or represented by the parsed data. Such techniques may be related to language parsing functions commonly used by designers of programming-language compilers, natural-language parsers, and user interfaces. Here, these techniques may identify a function as a verb or predicate phrase in an appropriately parsed set of data, but in other embodiments, other techniques and procedures may be used. In some cases, a function of an axiom may be identified all or in part by considering extrinsic information sources.

In this example, entity classes identified in the parsed data might comprise:

<regional manager>
<regional sales report>
<national sales manager>
<Director of Sales>
<national sales report>
<annual report>.

Functions identified in the parsed data might comprise:

<PrepareDocument>
<SubordinateTo>
<CompileInto>

Embodiments of the present invention may use a set of identified entity classes to identify a set of ontology concept nodes, wherein a first concept node is identical to, analogous to, or a function of a first identified entity class.

Embodiments of the present invention may further use a set of identified functions to generate a set of ontology process nodes, wherein a first process node is identical to, analogous to, or a function of a first identified function.

The logic embedded in the business-process model, in the parsed data, and in the set of axioms may be used to organize process nodes and concept nodes into a data structure that represents the logical relationships between the processes and the concepts in the ontology. In some embodiments, this data structure may comprise, but is not limited to one or more trees, directed graphs, databases, or networks.

The logic embedded in the business-process model, in the parsed data, and in the set of axioms may further be used to organize process nodes and concept nodes into triple data items, wherein each triple may correspond to an axiom of the set of axioms. Such a triple may be represented in a variety of forms, but in this example, it is represented by using the syntax:

predicate (subject, object).

Here, a predicate of a triple is analogous to a function of a corresponding axiom, a subject of the triple is analogous to an input entity of the corresponding axiom, and an object of the triple is analogous to an output entity of the corresponding axiom. In this example, the subject may perform the function of the predicate upon the object, or the object may be produced by applying the function of the predicate upon the subject.

Applying this method to the parsed data of the current example, may yield a set of triples:

(1) PrepareDocument (regional manager, regional sales report)
(2) SubordinateTo (regional manager, national sales manager)
(3) SubordinateTo (national sales manager, Director of Sales)
(4) CompileInto (regional sales report, national sales report)
(5) CompileInto (national sales report, annual report)

Each of these triples represents a rule that will be comprised by an expert-system knowledgebase, wherein the rule is analogous to the logic of one axiom derived from the business-process model. Triple (1), for example, may represent that an entity of class "regional manager" may produce an entity of class "regional sales report" by performing process "PrepareDocument." In some embodiments, such a rule might help an expert system infer an answer to a user query: "Who prepares regional sales reports for North America?" or to a user query: "What are the job functions of our regional manager?" In other embodiments, such a rule might allow an expert system or other type of artificially intelligent system to draw other types of conclusions based on the logic represented in the ontology and the axioms represented in the business-process model.

The embodiment of this example may further organize the set of triples into a repository or data structure known generically as a "triple store." The format and internal structure of the triple store is determined by techniques and procedures known to those skilled in the art.

The ontology generated by the embodiment of the present invention described in this invention may comprise the organized set of process and concept nodes. The ontology may further comprise the generated set of axioms represented by the triple store. In some embodiments, a generated ontology and a generated representation of a set of axioms may be distinct entities.

What is claimed is:

1. A method for automatically generating an ontology and a set of axioms from a business-process model, wherein the business-process model comprises a representation of a set of business processes, wherein the ontology comprises a set of concept nodes and a set of process nodes, and wherein an axiom of the set of axioms comprises a subject, an object, and a predicate, the method comprising:

a processor of a computer system parsing the representation into a set of parsed data,
wherein the set of parsed data comprises a first process input entity, a first process output entity, and a first process function, and wherein the first process input entity, the first process output entity, and the first process function are associated with a first business process of the set of business processes, and wherein the set of parsed data identifies a set of entity classes, and wherein a first input entity class of the set of entity classes is associated with the first process input entity, a first output entity class of the set of entity classes is associated with the first process output entity, and a first function class of the set of entity classes is associated with the first process function;

the processor deriving the set of axioms as a function of the set of parsed data, wherein the deriving comprises associating a first axiom of the set of axioms with the first business process, associating a first subject of the first axiom with the first process input entity and with the first input entity class, associating a first object of the first axiom with the first process output entity and with the first output entity class, and associating a first predicate of the first axiom with the first process function and with the first function class;

the processor identifying the set of concept nodes as a function of the set of parsed data and identifying the set of process nodes as a further function of the set of parsed data; and the processor populating the ontology with the set of process nodes and the set of concept nodes.

2. The method of claim 1, wherein the populating comprises organizing the process nodes of the set of process nodes into a first hierarchical data structure and organizing the concept nodes of the set of concept nodes into a second hierarchical data structure, wherein the organization of the first hierarchical data structure and the organization of the second hierarchical data structure are functions of the internal organization of the business-process model.

3. The method of claim 1, wherein the ontology further comprises the set of axioms.

4. A computer program product, comprising a computer-readable hardware storage device having a computer-readable program code stored therein, said program code configured to be executed by a processor of a computer system to implement a method for automatically generating an ontology and a set of axioms from a business-process model, wherein the business-process model comprises a representation of a set of business processes, wherein the ontology comprises a set of concept nodes and a set of process nodes, and wherein an axiom of the set of axioms comprises a subject, an object, and a predicate, the method comprising:

the processor parsing the representation into a set of parsed data, wherein the set of parsed data comprises a first process input entity, a first process output entity, and a first process function, and wherein the first process input entity, the first process output entity, and the first process function are associated with a first business process of the set of business processes, and wherein the set of parsed data identifies a set of entity classes, and wherein a first input entity class of the set of entity classes is associated with the first process input entity, a first output entity class of the set of entity classes is associated with the first process output entity, and a first function class of the set of entity classes is associated with the first process function;

the processor deriving the set of axioms as a function of the set of parsed data, wherein the deriving comprises associating a first axiom of the set of axioms with the first business process, associating a first subject of the first axiom with the first process input entity and with the first input entity class, associating a first object of the first axiom with the first process output entity and with the first output entity class, and associating a first predicate of the first axiom with the first process function and with the first function class;

the processor identifying the set of concept nodes as a function of the set of parsed data and identifying the set of process nodes as a further function of the set of parsed data; and the processor populating the ontology with the set of process nodes and the set of concept nodes.

5. The method of claim 4, wherein the populating comprises organizing the process nodes of the set of process nodes into a first hierarchical data structure and organizing the concept nodes of the set of concept nodes into a second hierarchical data structure, wherein the organization of the first hierarchical data structure and the organization of the second hierarchical data structure are functions of the internal organization of the business-process model.

6. The method of claim 4, wherein the ontology further comprises the set of axioms.

7. A computer system comprising a processor, a memory coupled to said processor, and a computer-readable hardware storage device coupled to said processor, said storage device containing program code configured to be run by said processor via the memory to implement a method for automatically generating an ontology and a set of axioms from a business-process model, wherein the business-process model comprises a representation of a set of business processes, wherein the ontology comprises a set of concept nodes and a set of process nodes, and wherein an axiom of the set of axioms comprises a subject, an object, and a predicate, the method comprising:

the processor parsing the representation into a set of parsed data, wherein the set of parsed data comprises a first process input entity, a first process output entity, and a first process function, and wherein the first process input entity, the first process output entity, and the first process function are associated with a first business process of the set of business processes, and wherein the set of parsed data identifies a set of entity classes, and wherein a first input entity class of the set of entity classes is associated with the first process input entity, a first output entity class of the set of entity classes is associated with the first process output entity, and a first function class of the set of entity classes is associated with the first process function;

the processor deriving the set of axioms as a function of the set of parsed data, wherein the deriving comprises associating a first axiom of the set of axioms with the first business process, associating a first subject of the first axiom with the first process input entity and with the first input entity class, associating a first object of the first axiom with the first process output entity and with the first output entity class, and associating a first predicate of the first axiom with the first process function and with the first function class;

the processor identifying the set of concept nodes as a function of the set of parsed data and identifying the set of process nodes as a further function of the set of parsed data; and the processor populating the ontology with the set of process nodes and the set of concept nodes.

8. A process for supporting computer infrastructure, said process comprising providing at least one support service for at least one of creating, integrating, hosting, maintaining, and deploying computer-readable program code in a computer system, wherein the program code in combination with said computer system is configured to implement a method for automatically generating an ontology and a set of axioms from a business-process model, wherein the business-process model comprises a representation of a set of business processes, wherein the ontology comprises a set of concept nodes and a set of process nodes, and wherein an axiom of the set of axioms comprises a subject, an object, and a predicate, the method comprising:

the processor parsing the representation into a set of parsed data, wherein the set of parsed data comprises a first process input entity, a first process output entity, and a first process function, and wherein the first process input entity, the first process output entity, and the first process function are associated with a first business process of the set of business processes, and wherein the set of parsed data identifies a set of entity classes, and wherein a first input entity class of the set of entity classes is associated with the first process input entity, a first output entity class of the set of entity classes is associated with the first process output entity, and a first function class of the set of entity classes is associated with the first process function;

the processor deriving the set of axioms as a function of the set of parsed data, wherein the deriving comprises associating a first axiom of the set of axioms with the first business process, associating a first subject of the first axiom with the first process input entity and with the first input entity class, associating a first object of the first axiom with the first process output entity and with the first output entity class, and associating a first predicate of the first axiom with the first process function and with the first function class;

the processor identifying the set of concept nodes as a function of the set of parsed data and identifying the set of process nodes as a further function of the set of parsed data; and the processor populating the ontology with the set of process nodes and the set of concept nodes.

9. A method for automatically generating an ontology and a set of axioms from a business-process model, wherein the business-process model comprises a representation of a set of business processes, wherein the ontology comprises a set of concept nodes and a set of process nodes, and wherein an axiom of the set of axioms comprises a subject, an object, and a predicate, the method comprising:

a processor of a computer system parsing the representation into a set of parsed data, wherein the set of parsed data comprises a first process input entity, a first process output entity, and a first process function, and wherein the first process input entity, the first process output entity, and the first process function are associated with a first business process of the set of business processes;

the processor deriving the set of axioms as a function of the set of parsed data;

the processor identifying the set of concept nodes as a function of the set of parsed data and identifying the set of process nodes as a further function of the set of parsed data, wherein the identifying the set of concept nodes and the identifying the set of process nodes further comprises:

the processor identifying a first subject concept node of the set of concept nodes as a function of the first process input entity;

the processor identifying a first object concept node of the set of concept nodes as a function of the first process output entity; and the processor identifying a first predicate concept node of the set of process nodes as a function of the first process function, wherein the first predicate node identifies a first ontology process, and wherein performing the first ontology process upon a first subject entity identified by the first concept subject node generates a first object entity identified by the first concept object node; and the processor populating the ontology with the set of process nodes and the set of concept nodes.

10. A computer program product, comprising a computer-readable hardware storage device having a computer-readable program code stored therein, said program code configured to be executed by a processor of a computer system to implement a method for automatically generating an ontology and a set of axioms from a business-process model, wherein the business-process model comprises a representation of a set of business processes, wherein the ontology comprises a set of concept nodes and a set of process nodes, and wherein an axiom of the set of axioms comprises a subject, an object, and a predicate, the method comprising:

the processor parsing the representation into a set of parsed data, wherein the set of parsed data comprises a first process input entity, a first process output entity, and a first process function, and wherein the first process input entity, the first process output entity, and the first process function are associated with a first business process of the set of business processes;

the processor deriving the set of axioms as a function of the set of parsed data;

the processor identifying the set of concept nodes as a function of the set of parsed data and identifying the set of process nodes as a further function of the set of parsed data, wherein the identifying the set of concept nodes and the identifying the set of process nodes further comprises:

the processor identifying a first subject concept node of the set of concept nodes as a function of the first process input entity;

the processor identifying a first object concept node of the set of concept nodes as a function of the first process output entity; and the processor identifying a first predicate concept node of the set of process nodes as a function of the first process function, wherein the first predicate node identifies a first ontology process, and wherein performing the first ontology process upon a first subject entity identified by the first concept subject node generates a first object entity identified by the first concept object node; and the processor populating the ontology with the set of process nodes and the set of concept nodes.

11. A computer system comprising a processor, a memory coupled to said processor, and a computer-readable hardware storage device coupled to said processor, said storage device containing program code configured to be run by said processor via the memory to implement a method for automatically generating an ontology and a set of axioms from a business-process model, wherein the business-process model comprises a representation of a set of business processes, wherein the ontology comprises a set of concept nodes and a set of process nodes, and wherein an axiom of the set of axioms comprises a subject, an object, and a predicate, the method comprising:

the processor parsing the representation into a set of parsed data, wherein the set of parsed data comprises a first process input entity, a first process output entity, and a first process function, and wherein the first process input entity, the first process output entity, and the first process function are associated with a first business process of the set of business processes;

the processor deriving the set of axioms as a function of the set of parsed data;

the processor identifying the set of concept nodes as a function of the set of parsed data and identifying the set of process nodes as a further function of the set of parsed data, wherein the identifying the set of concept nodes and the identifying the set of process nodes further comprises:

the processor identifying a first subject concept node of the set of concept nodes as a function of the first process input entity;

the processor identifying a first object concept node of the set of concept nodes as a function of the first process output entity; and the processor identifying a first predicate concept node of the set of process nodes as a function of the first process function, wherein the first predicate node identifies a first ontology process, and wherein performing the first ontology process upon a first subject entity identified by the first concept subject node generates a first object entity identified by the first concept object node; and the processor populating the ontology with the set of process nodes and the set of concept nodes.

\* \* \* \* \*